(No Model.)
J. HURSH.
HORSE FOR SUSPENDING CARCASSES.
No. 322,181. Patented July 14, 1885.
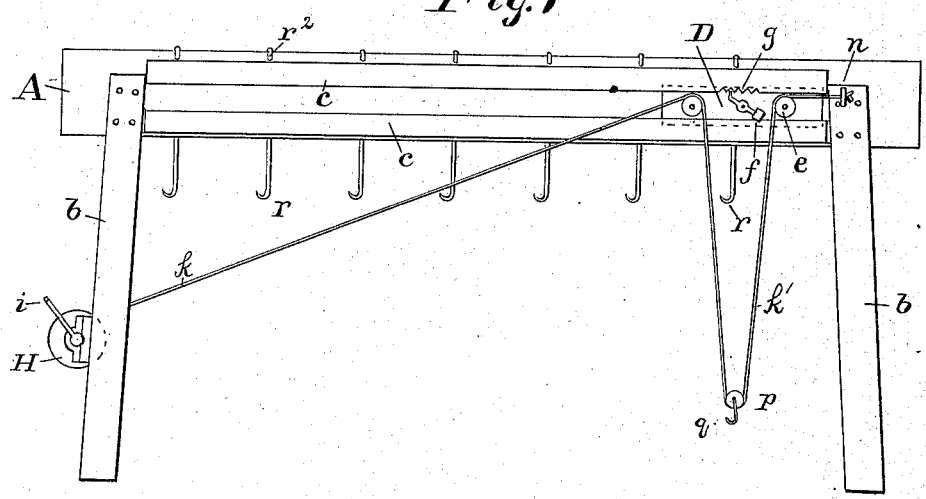
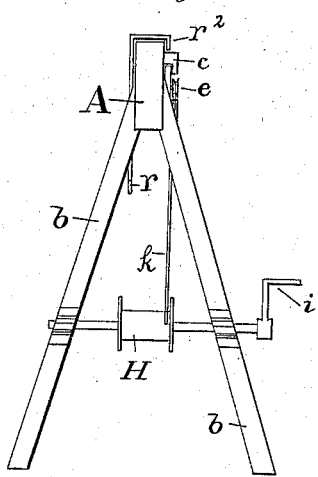
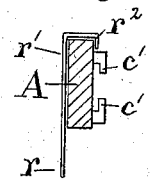
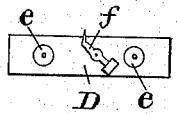
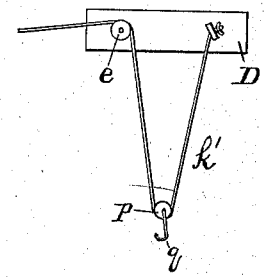
WITNESSES:
A. C. Eader
John E. Morris
INVENTOR:
John Hursh
By Chas B. Mann
Attorney.

UNITED STATES PATENT OFFICE.

JOHN HURSH, OF ORRVILLE, OHIO.

HORSE FOR SUSPENDING CARCASSES.

SPECIFICATION forming part of Letters Patent No. 322,181, dated July 14, 1885.

Application filed March 16, 1885. (No model.)

*To all whom it may concern:*

Be it known that I, JOHN HURSH, a citizen of the United States, residing at Orrville, in the county of Wayne and State of Ohio, have invented certain new and useful Improvements in Horses for Suspending Carcasses, of which the following is a specification.

My invention relates to a horse for hoisting and suspending the carcasses of animals.

The invention will first be described and then designated in the claims.

The drawings herewith illustrate the invention, Figure 1 being a side elevation of the horse; Fig. 2, an end view of same; Fig. 3, a cross-section of the beam; Fig. 4, a detached view of the sliding pulley-plate. Fig. 5 shows a modification in the rig of the movable plate.

The letter A designates the beam; $b$, the legs to support it, though it may be supported in any suitable manner. One side of the beam is provided with two horizontal parallel bars, $c$, each provided with a flange, $c'$, (shown in Fig. 3,) constituting a slide. A plate, D, fits loosely in this slide and is adapted to move therein along the side of the beam from one end thereof to the other. This movable plate is provided on the outside with two grooved pulleys, $e$, and a pawl, $f$. The pawl is designed to engage with ratchet-teeth $g$ on one of the bars $c$, and serves to retain the plate and pulleys in any desired position. A windlass, H, and crank $i$ are fixed on the two legs at one end of the horse, and a rope, $k$, has one of its ends made fast at $n$ to the beam near the end remote from the windlass. This rope passes over the two pulleys, which serve as supports for it, and a portion, $k'$, sags down and forms a sort of loop between the said supports, (the pulleys,) and its other end is fixed on the windlass. A pulley, $p$, rides on the loop or down-sagging portion $k'$, and carries a hoisting-hook, $q$. By this arrangement a carcass may be attached to the hoisting-hook $q$ and elevated by turning the crank $i$. Hooks $r$ are attached to the beam, and are pendent below it, and each one serves for the suspension of a carcass. These hooks may be conveniently attached to the beam by constructing them with a long shank, $r'$, and providing the upper end with a hook, $r^2$, to take over the top of the beam, as shown. Six or eight, or any desired number, of these suspension-hooks may be used, according to the length of the beam.

The operation of the device may be described as follows: The pulley-plate should be moved to bring the hoisting-hook $q$ below one of the fixed suspension-hooks $r$. The pawl $f$ will retain it in position. By turning the crank backward the hoisting-hook will be lowered and then may be engaged with the hock of the animal's leg, or with a stick placed crosswise between the two legs. By then turning the crank forward the hoisting-hook will elevate the carcass until the hock or the stick aforesaid is raised just above the suspension-hook $r$. Then an attendant may direct the said suspension-hook (which is movable on the beam) to insure its engagement with the hock (or stick) while the carcass is slightly lowered and the hoisting-hook disengaged. It will thus be seen the hoisting and suspending of heavy carcasses by this horse are attended with very little labor.

Instead of the pawl $f$ and ratchet it is obvious holes may be bored in the beam and a pin employed to enter any desired hole and project sidewise in front of the pulley-plate.

Instead of one end of the rope $k$ being made fast to the beam, as in Fig. 1, it may be made fast to the movable plate, as shown in Fig. 5, and in this case one pulley, $e$, may be dispensed with.

It is obvious that instead of pulleys $e$ the sliding plate D may have any substitute device to support the rope $k$—for instance, pins projecting sidewise from the plate may be used.

Having described my invention, I claim and desire to secure by Letters Patent of the United States—

1. A horse for hoisting and suspending carcasses, having in combination a beam suitably supported, suspension-hooks $r$, attached to and pendent below the beam, a windlass mounted below one end of the beam, a movable plate on the beam having two projecting rope-supports, a rope having one end made fast, as described, and passed over the two rope-supports, sagging down between said supports, and its other end fixed to the windlass, and a hoisting-hook, $q$, riding on the down-sagging part of the rope, as set forth.

2. A horse for hoisting and suspending carcasses, having in combination a beam suitably supported, suspension-hooks $r$, attached to the beam, parallel bars constituting a slide fixed on the beam, a movable plate fitting in said slide and provided with two rope-supports, $e$, a rope having one end made fast to the beam passed over the said two supports and sagging down between them, and a hoisting-hook, $q$, riding on the down-sagging part of the rope, as set forth.

3. A horse for hoisting and suspending carcasses, having in combination a beam suitably supported, suspension-hooks $r$, attached to the beam, parallel bars constituting a slide fixed on the beam, a movable plate fitting in said slide and provided with rope-supports, a rope passed over the said supports and having a hoisting-hook, and a retaining device, substantially as described, to retain the movable plate in position, as set forth.

In testimony whereof I affix my signature in presence of two witnesses.

JOHN HURSH.

Witnesses:
H. M. WILSON,
S. REBMAN.